United States Patent
Vu et al.

(10) Patent No.: US 6,548,977 B2
(45) Date of Patent: Apr. 15, 2003

(54) MOTOR TRACKING CONTROL SYSTEM

(75) Inventors: Hung D. Vu, Pembroke, MA (US); Ralph W. Horber, Marshfield, MA (US)

(73) Assignee: Seiberco Incorporated, Braintree, MA (US)

(*) Notice: Subject to any disclaimer, the term of this patent is extended or adjusted under 35 U.S.C. 154(b) by 64 days.

(21) Appl. No.: 09/904,000

(22) Filed: Jul. 12, 2001

(65) Prior Publication Data

US 2003/0020421 A1 Jan. 30, 2003

(51) Int. Cl.⁷ .............. H02P 1/00; H02P 3/00; H02P 5/00; H02P 7/00
(52) U.S. Cl. ............. 318/442; 318/123; 318/106; 388/901; 324/207.15
(58) Field of Search .................. 318/442, 496, 318/721, 724, 139, 123, 106, 108, 109, 138, 254, 439, 766; 388/901; 324/207.15, 207.16, 207.25

(56) References Cited

U.S. PATENT DOCUMENTS

| | | | |
|---|---|---|---|
| 4,687,961 A | 8/1987 | Horber | |
| 5,187,724 A | 2/1993 | Hibino et al. | |
| 5,287,285 A | 2/1994 | Tsai et al. | |
| 5,329,195 A | 7/1994 | Horber et al. | |
| 5,412,317 A | 5/1995 | Kyoizumi | |
| 5,444,368 A | * 8/1995 | Horber | 324/207.16 |
| 5,880,565 A | * 3/1999 | Watanabe | 318/139 |
| 5,998,783 A | * 12/1999 | Stridsberg | 318/565 |

* cited by examiner

Primary Examiner—Robert E. Nappi
Assistant Examiner—Edgardo San Martin
(74) Attorney, Agent, or Firm—Ira S. Dorman

(57) ABSTRACT

An electronic circuit and software control methodology tracks motor position in a motor drive system. High power consumption position transducers, such as inductive sensors or optical encoders, can be controlled in a variable active duty cycle mode to reduce power and yet maintain motor position information while the main power is off. A lower power battery backup circuit is implemented as a secondary power source, and is automatically brought in operation when the main power supply is disabled. A dedicated control circuit operates during AC power outages, and the circuit average power can be controlled to a minimal rate, based on the rate of change of motor position. The motor can be externally driven, up to a defined limit speed, without losing its actual position information.

29 Claims, 15 Drawing Sheets

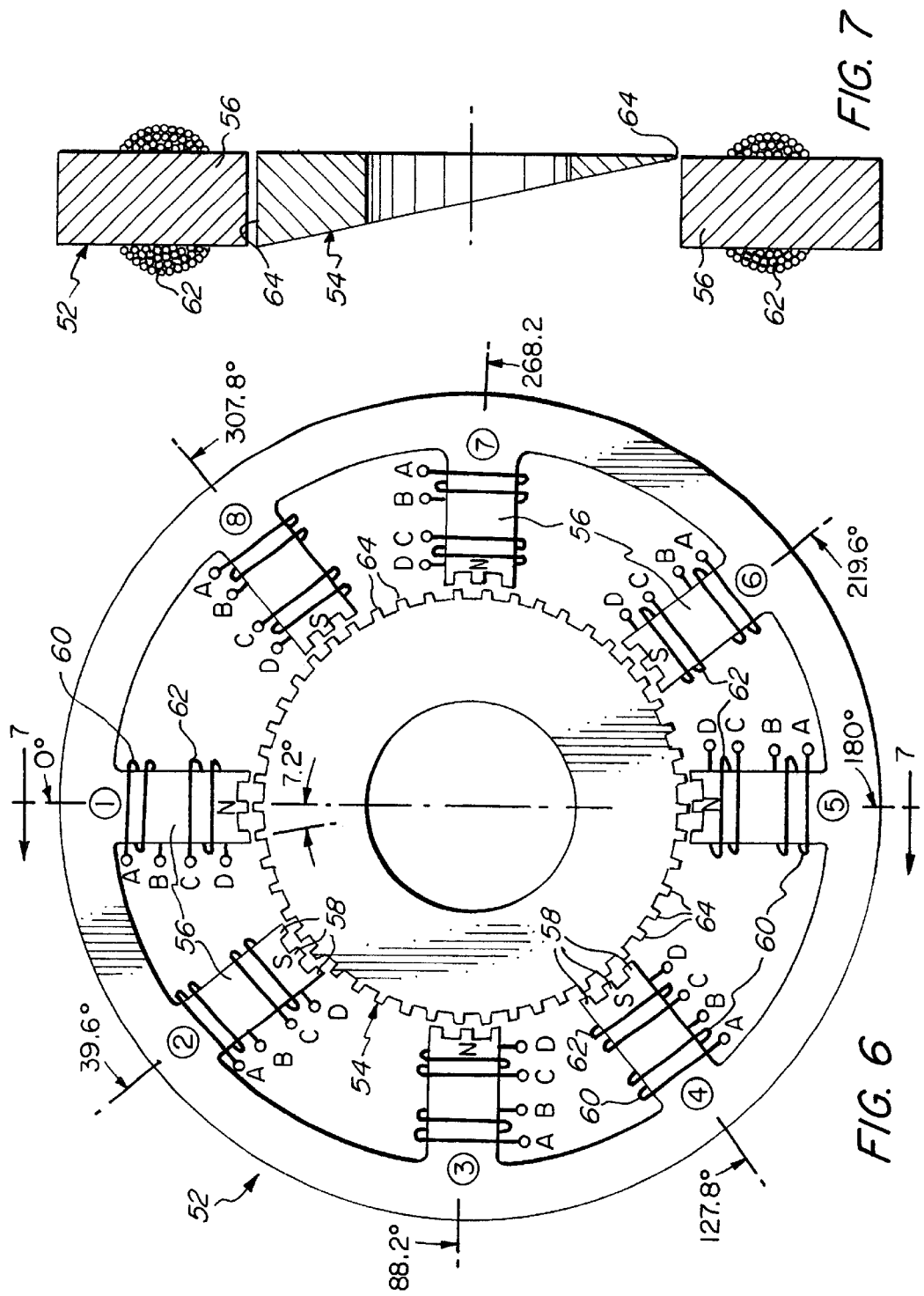

MOTOR TRACKING CONTROL SYSTEM

BACKGROUND OF THE INVENTION

In many applications in which coordinated control for driving one or more motors on multiple axes is required, such as in robotics applications, machine tools, and the like, multi-turn absolute position information (i.e., information from which motor position from a known reference point, normally established at the time of machine setup, can be determined) is often essential. If the motor position relative to the machine home or other reference is unknown, the controller must drive the motor back to its reference point each time power is applied to establish the initial position before normal operation can commence. Homing to synchronize a multi-axis system under such circumstances is often highly inconvenient and time consuming, especially when constraints are present in the travel path.

Two basic types of signal feedback position transducers are currently in general used in motor drive systems. Incremental position transducers, such as optical encoders, typically provide two channel outputs in quadrature configuration; changes in position are determined incrementally by decoding the quadrature state transitions that occur in the channel signals. Absolute position transducers provide signals from which the specific position of a motor shaft can be determined at any point within a single motor revolution.

Neither of the conventional transducers described provides multiple-revolution absolute position information. As presently configured, therefore, they are not adequate for most current applications, which require numerous motor revolutions to achieve a desired range of travel. Consequently, electronic counters are commonly used to record absolute motor position during multiple revolutions.

In order to maintain absolute multi-turn position information when the main power for driving the motor has been interrupted, it is of course necessary to supply power to the circuit from a secondary source; DC battery backup circuits are usually used to accommodate AC power failures. In normal operation, however, the power consumption of most position transducers is very high, typically on the order of 50–200 milliamperes at 5V or 12V depending upon the particular kind of transducer involved. The energy capacity of the battery employed therefore represents a fundamental limitation upon the period during which an AC power failure, or machine downtime, can be accommodated without losing the ability to track the position of a motor. Consequently, power conservation is a matter of primary concern in such systems.

The use of inductive sensors in motor control systems is well known and is described, for example, in Horber U.S. Pat. No. 4,687,961 and Horber and Vu U.S. Pat. No. 5,329,195 (the specifications of which patents are hereby incorporated hereinto by reference). Such sensors afford, among other benefits, high levels of accuracy, reliability, and robustness.

Hibino et al. U.S. Pat. No. 5,187,724 provides an absolute position detecting device which employs a battery-powered auxiliary power supply. An electronic multi-shaft absolute position detecting device is disclosed in Tsai et al. U.S. Pat. No. 5,287,285, in which a spare power circuit enables continuous detection of position signals, despite power supply disruptions. Kyoizumi U.S. Pat. No. 5,412,317 provides a position detector in which an absolute position sensor (preferably of the magnetostrictive line type) and an incremental position sensor (preferably of the magnetic induction type) are utilized in combination.

SUMMARY OF THE INVENTION

It is a broad object of the present invention to provide a novel control system, and a novel control method, for the continuous, non-volatile tracking of the position of a motor armature.

More specific objects of the invention are to provide such a system and method wherein a secondary battery-powered backup circuit is provided to maintain position-tracking capability, despite loss or termination of power in the primary power supply, and wherein power consumption is conserved so as to extend the potential duration of the backup mode.

Another object of the invention is to provide a dual-sensor position transducer suitable for use in such a tracking system and method, where the transducer is of compact, and relatively incomplex and inexpensive, construction.

It has now been found that certain of the foregoing and related objects of the invention are attained by the provision of a control system for the continuous, non-volatile tracking of the position of a motor armature, which system comprises motor armature position data acquisition and storage means, a primary power supply circuit for delivering drive current to the motor, a battery-powered secondary circuit, and means for operatively connecting the primary power supply circuit to the data acquisition and storage means. The data acquisition and storage means includes an armature position transducer, at least one electronic data processing unit, and sampling means for causing the electronic data processing unit to intermittently access the position transducer, for defined time periods and at controlled variable frequency of access. The means for operatively connecting serves to connect automatically the secondary circuit to the data acquisition and storage means, so as to enter and implement the backup mode, such connection occurring only upon disruption of power in the primary power supply circuit. The frequency of access caused by the sampling means in the backup mode varies in a direct relationship to the speed of the motor armature, as detected by the position transducer.

In most instances the active periods, during which the position transducer draws full operating power, are limited substantially to the defined periods of access (albeit generally of slightly longer duration). All of the active periods will usually be of the same length, and the frequency of access will advantageously be varied by adjusting the duration of inactive periods which intervene between the active periods and are all also of equal duration. The position transducer draws substantially less than full operating power during the inactive periods, such that power is applied to the position transducer in accordance with a variable duty cycle. The primary power supply circuit will normally be disconnected from the data acquisition and storage means when the secondary circuit is connected thereto, and the position transducer will usually draw only nominal power during the inactive periods. Preferably, the data acquisition and storage means will comprise primary and secondary electronic data processing units, operatively inconnected and having relatively high computing capability and relatively low computing capability respectively.

The positon transducer will, in most instances, comprise at least one sensor selected from the group consisting of encoders and inductive sensors, constructed for the detection of rotary armature movement. The sensor (or each of a plurality of sensors) will preferably generate at least one set of at least two electrically out-of-phase signals that vary sinusoidally so as to represent trigonometric functions from which the angle of a shaft of a motor can be determined. The signal set will normally consist of two signals that bear a 90° phase relationship to one another, with the trigonometric functions being sine and cosine functions; the sampling means will advantageously comprise a zero crossing point detector and, in particular, a quadrature detector.

In especially preferred embodiments the position transducer will comprise a second sensor, with the "one" signal set being a first signal set representing a minimal whole number of electrical cycles of the "at least two signals," and with the second sensor being configured to generate a second signal set representing a multiple whole number of the minimal number of the electrical cycles; in such embodiments only the "first" signal will normally be utilized for causing the frequency of access to vary in the backup mode.

In particularly desirable embodiments of the system, components of plural sensors will be integrated into a substantially circular rotor body. Such a rotor body may be of generally wedge-shaped cross section, so as to induce (by virtue of the variation of ferromagnetic material presented to the several magnetics fields) a single electrical cycle per revolution and to provide the "first" signal, and will have peripheral structure configured for inducing multiple electrical cycles per revolution, thereby providing the "second" signal. Alternatively, the rotor body may be mounted eccentrically of the stator, such that the varying gap therebetween (and the consequential variation in magnetic permeability presented) will again cause a single electrical cycle to be induced per revolution; it will be appreciated that other structures may generate two or more electrical cycles to constitute the "first" signal.

Certain objects of the invention are attained by the provision of a method for the continuous, non-volatile tracking of the position of a motor armature, utilizing a control system of the character herein described. In carrying out the method the primary power supply circuit, used for delivering drive current to the motor, is normally operatively connected to the data acquisition and storage means. Upon disruption of power in the primary power supply circuit, the secondary, backup circuit is connected automatically to the data acquisition and a storage means, and the frequency of position data sampling is caused to vary in a direct relationship to the speed of the motor armature.

Various features of the system described are utilized to implement specific aspects of the method of the invention. In particularly preferred embodiments, the position transducer will comprise at least two sensors, one being configured to generate a first signal set, representing a minimum number electrical cycles per revolution (advantageously, only a single cycle), and the other being configured to generate a second signal set representing ten or more electrical cycles per revolution, with only the first signal set being utilized for causing variation in the frequency of access to position data.

Additional objects of the invention are attained by the provision of a control system for tracking the position of a motor armature, which comprises armature position data acquisition and storage means, an armature position transducer, at least one electronic data processing unit, and sampling means for causing the electronic data processing unit to intermittently access the position transducer, for defined time periods and at controlled frequency of access. The position transducer utilized comprises first and second inductive sensors, one of which is configured to generate a first signal set and the other of which is configured to generate a second signal set, each signal set consisting of two sinusoidal waves that are 90° out of phase and that represent sine and cosine functions, from which the angle of the shaft of a motor can be determined. The first signal set represents a minimal whole number of electrical cycles of the two signals, and the second signal set represents a multiple whole number of the minimal number of the electrical cycles, the first and second sensors being selectively accessible by the electronic data processing means by way of the sampling means.

Preferably, the number of cycles comprising the second signal set will be at least one order of magnitude larger than the minimal number. The first and second sensors utilized in the system will most desirably comprise a substantially circular rotor body into which components of each sensor are integrated, as hereinbefore and hereinafter described.

Thus, in accordance with the present invention a variable frequency sampling method is applied to efficiently utilize the battery charge in a backup circuit for a motor position transducer. This is done by varying the duty cycle, for accessing the transducer, as a function of the velocity at which the motor armature moves due to the application of external forces. The control cycle optimally consists of two time segments, defined herein as ON time and OFF time, with the ratio of ON time to the total of ON time plus OFF time constituting the duty cycle; needless to say, the smaller the duty cycle value the lower the power consumption level will be. Albeit other schemes may be employed, the duty cycle will most suitably utilize a fixed ON time and a variable OFF time, with a suitable OFF time duration being determined and applied after each ON time interval in which position data are sampled and velocity is sensed and calculated.

BRIEF DESCRIPTION OF THE DRAWINGS

FIG. 6 is a diagrammatic planar view of a rotor and an eight-pole stator assembly, embodying the present invention and having integrated dual-sensor features;

FIG. 7 is a sectional view of the assembly of FIG. 6, taken along line 7—7 thereof.

DETAILED DESCRIPTION OF THE PREFERRED ILLUSTRATED AND EMBODIMENTS

The control elements utilized in the system of the invention consist generally of an electronic circuit for position detection, a low-power battery backup circuit, and application software to track the motor shaft position. The implementations, as applied to three position transducers, are described below:

EXAMPLE ONE

Figure 1:
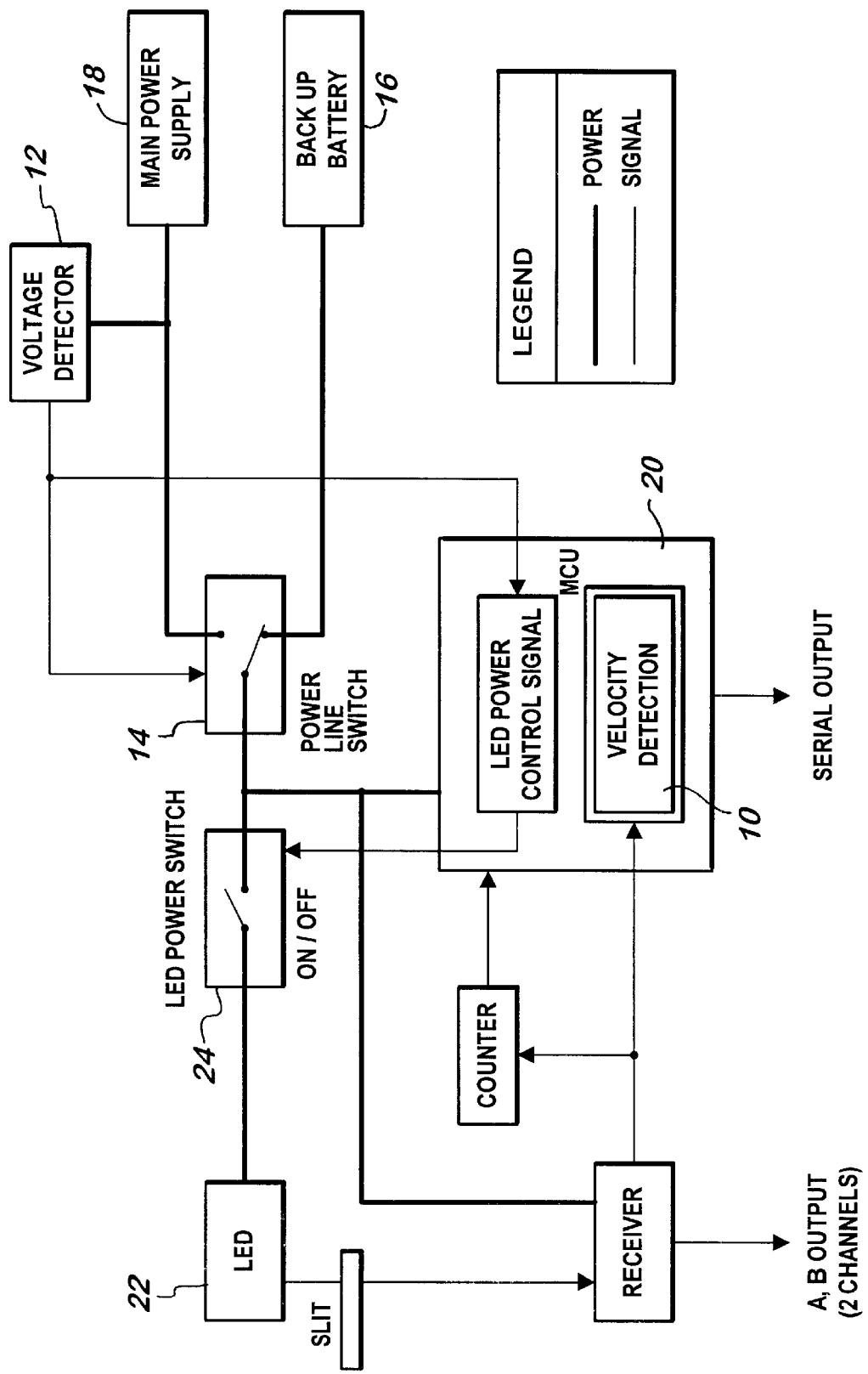
FIG. 1 is a block diagram showing an encoder power control system embodying the present invention.

With the exception that a run/stop detection circuit is used in place of the velocity detection circuit 10 shown, FIG. 1 depicts a typical power control system for an optical incremental encoder having two channel outputs at a fixed number of pulses per revolution. In normal operating mode the voltage detector circuit 12 controls the power line switch 14 so that the backup battery 16 is disconnected; i.e., the switch 14 is in its alternate position (not depicted), and connects the main power supply 18 to the control circuit; the microcontroller unit (MCU) 20 is signalled to operate at full tracking speed.

When the voltage detector 12 senses a power loss from the main supply 18, the backup mode is implemented by moving the switch 14 to the position shown in the Figure. In the backup mode MCU 20 effects a periodic sampling, with the LED power circuit 22 being energized by closing the switch 24, which occurs only when position data are to be obtained.

As indicated, the encoder LED power circuit 22 is conventionally controlled, in battery backup mode, by detecting motor shaft movement by way of a run/stop detection circuit (not illustrated). If no movement is detected for a predetermined period of time, the sampling rate is reduced to a fixed frequency; otherwise, full power is applied.

Figure 2A:
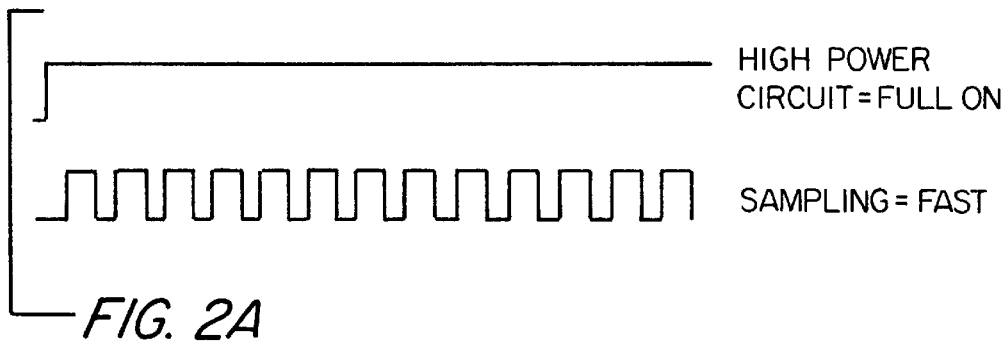
FIG. 2 comprises diagrams of power control timing schemes in normal and backup modes, in accordance with the present invention.
Figure 2B:
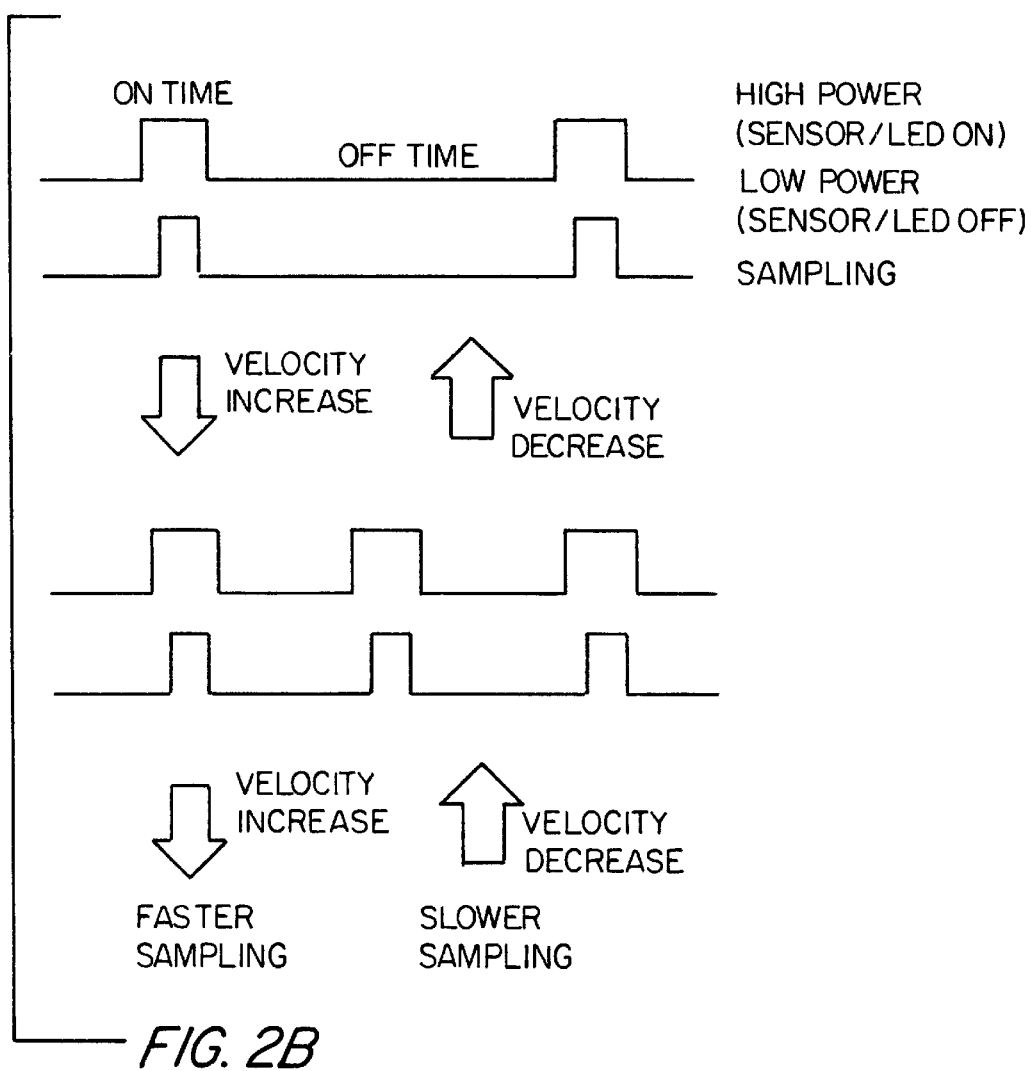

In accordance with the present invention, a variable duty cycle is applied to the LED power control switch circuit 24 based upon shaft velocity, as determined by velocity detection circuit 10. FIG. 2A shows the power control scheme applied under normal (full power) conditions; FIG. 2B shows a basic power-control timing scheme using the variable frequency access technique of the invention. As can be seen, the operation duty cycle is increased (by decreasing the OFF time interval) proportionally to the velocity of the motor shaft.

When the sensed velocity is zero, the duty cycle and the power consumption level have their lowest values. The velocity calculation is updated at each sample interval, and the MCU 20 adjusts the power ON/OFF duty cycle in direct relationship to the measured velocity so as to best accommodate the rate of change in position, subject to a defined upper limit. It will be appreciated that the sampling rate should be so controlled as to minimize the battery power drain while still allowing the motor to be externally driven, as needed, at a maximum practical rate.

As a result, power utilization is much more efficient, and battery life (runtime) between charges is increased by several times as compared to conventional methods.

EXAMPLE TWO

Figure 3:
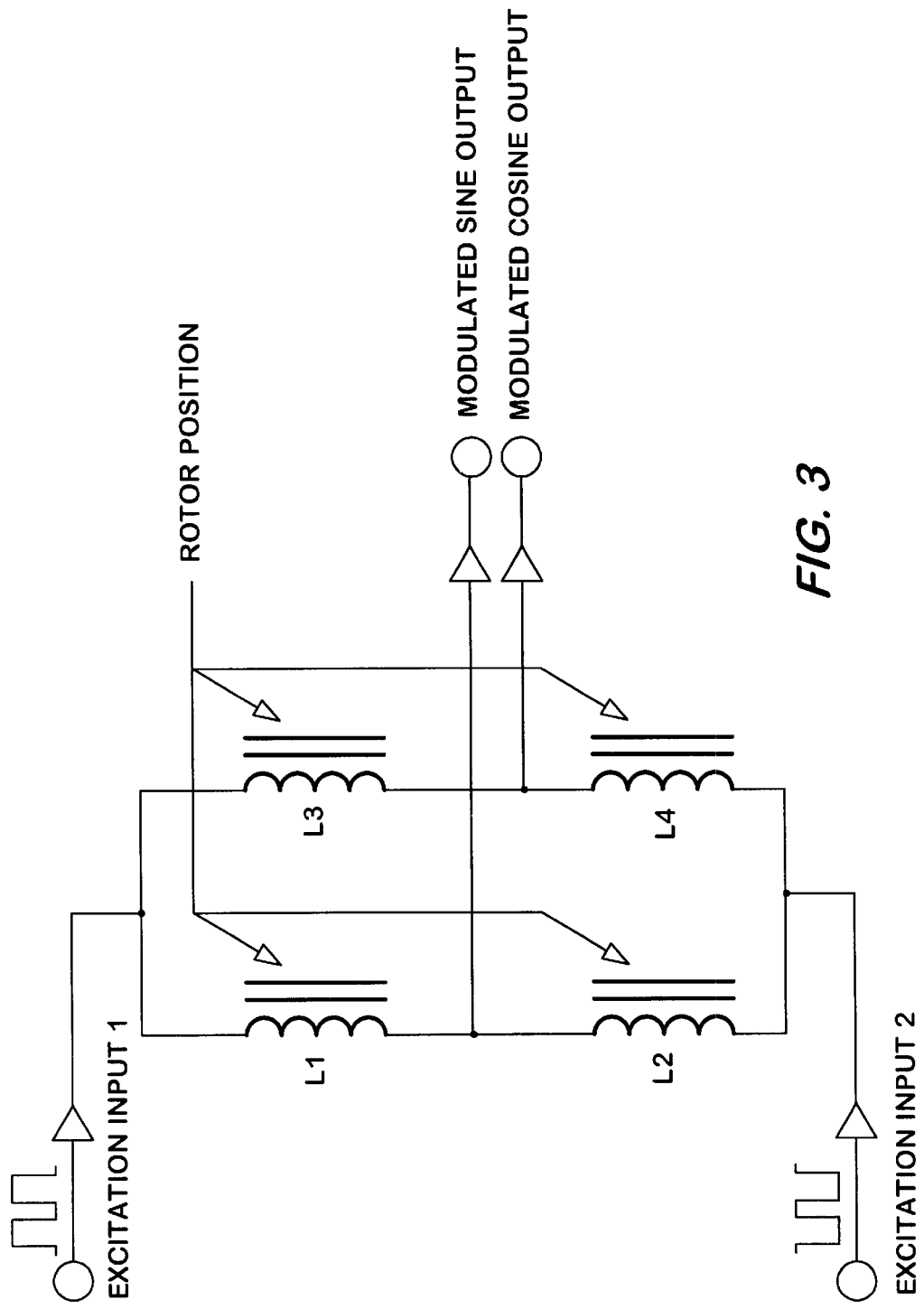
FIG. 3 is a diagrammatic illustration of an inductive sensor circuit arrangement suitable for use in the present invention.

A second type of position transducer, by which the methodology of the present invention may be implemented in a highly effective manner and with a further greatly increased level of power conservation, utilizes inductive sensors of the kind diagrammatically illustrated in FIG. 3. Elements L1 and L2 are so arranged that the magnetic effects, varying as a function of the angular position of the motor rotor, produce inductance changes that are 180° out of phase; elements L3 and L4 bear the same relationship. Elements L1 and L3, and L2 and L4, respectively, are also mutually spaced at 90°. Thus, the sensor output signals vary sinusoidally, and represent sine and cosine functions from which the rotor angular position can be determined through means and algorithms that are well known to those skilled in the art.

Unlike an incremental encoder, each cycle of an inductive sine/cosine signal pair contains a range of position information that can be resolved by taking arctangent values of the angle between zero to $2\pi$, thereby enabling incremental tracking of the change in position so as to produce multi-turn absolute position data. The number of sine/cosine cycles produced per motor revolution is of course dependant upon the design of the motor and can, as a practical matter, range from a single cycle per revolution to as many as two hundred cycles or more; each cycle also provides absolute position data within one revolution of the armature. Moreover, sine/cosine pairs can be resolved into a range of specific position data points, typically providing 1,000 to 65,000 motor steps per cycle, depending in part upon the resolution capability of the to analog-to-digital converter of the master MCU (or CPU) employed.

The use of a sensor that generates only one sine/cosine cycle per revolution enables sampling frequency, and the control duty cycle, to be reduced to the lowest possible rate and value, thereby greatly reducing battery power consumption as compared to that which occurs in an incremental encoder system. Because single-cycle sensors lack sufficient resolution and accuracy for most modern motor control applications, however, systems providing multiple feedback cycles per revolution must usually be employed. High cycle-count systems will of course produce a corresponding reduction in the runtime of which the backup battery is capable, due to the substantial increase in the frequency of sampling that is required in order to provide the desired level of dynamic tracking.

In accordance with the present invention, the power consumption of an inductive sensor, operating in a backup mode, is controlled by exciting the sensor circuit with a fixed ON time interval (during which position data are obtained), and establishing a successive OFF time interval based upon a calculated motor velocity value, which is of course a function of the frequency of position data change. Thus, the sampling period is varied in accordance with the sensed need for tracking of motor shaft movement; the average power consumption is reduced proportionally, as reflected in a duty cycle value. Moreover, a secondary, relatively low-power MCU can be utilized to track only the total number of sine/cosine cycles. This is done effectively by converting each sine/cosine signal pair to just four quadrature states (or steps) per cycle, as is conventionally done by detecting zero crossing points of the sinusoidal waves.

By way of specific example, for an inductive sensor that provides a single sine/cosine cycle per revolution, power consumption "P" is approximated:

$$P=[NP*(0.0001/0.0321)]+\text{quiescent power,}$$

where NP is the nominal power required to operate the sensor in its normal, continuous mode, 0.0001 is an arbitrary ON time value, chosen for illustrative purposes only, 0.0321 is a similarly chosen arbitrary maximum rest period for the motor shaft (ON time plus OFF time), and the circuit quiescent power is negligible (e.g., 70 micro amps at 5V), all times being expressed in fractions of a second. For a sensor operating at a nominal power of 500 mW (5V, 100 mA) under the assigned time values specified, a 3.6V 3600 mAhr battery pack can provide a maximum backup runtime to a couple of hundred days.

It will be appreciated that, for the case described, a miscount will occur if the motor is externally driven (forward or backward) at such a speed that the quadrature rate change exceeds one transition per 32 millisecond period; i.e., the acceleration limit is equal to $1/0.032 * 2\pi/4$, or about 50 radians/s/s. A higher acceleration rate can be accommodated by setting the maximum OFF time to a lower value, but with a commensurate sacrifice of power conservation.

Figure 4A:
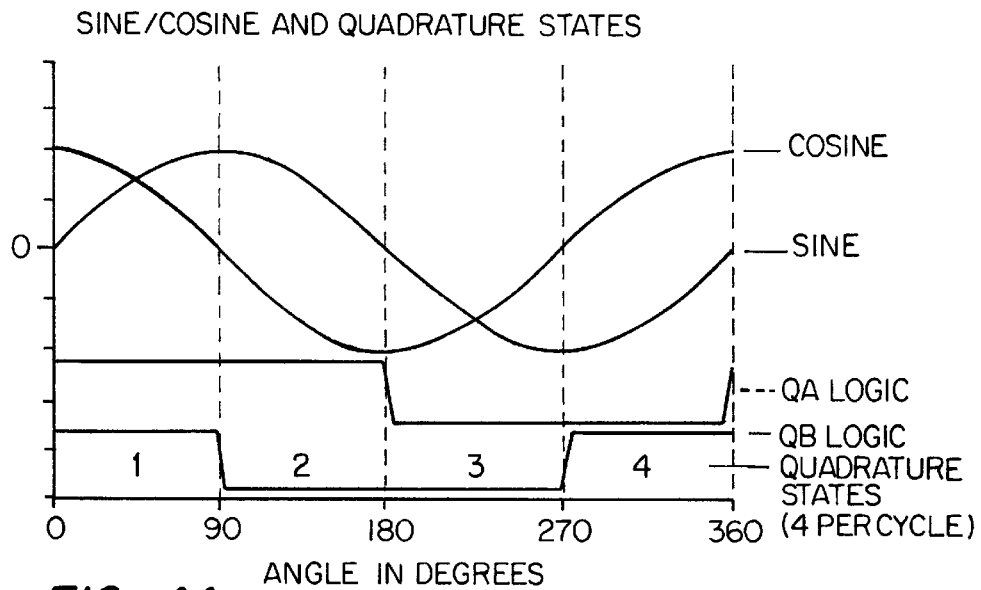
FIG. 4 comprises diagrammatic illustrations of inductive sensor output signals, FIG. 4A depicting sine/cosine waves and quadrature states, and FIG. 4B showing sine wave feedback signals from two inductive sensors, one sensor generating a single electrical cycle per mechanical revolution and the other generating ten cycles per revolution (that number being significantly reduced from optimal, and cosine wave signals being omitted, for clarity of illustration)
Figure 4B:
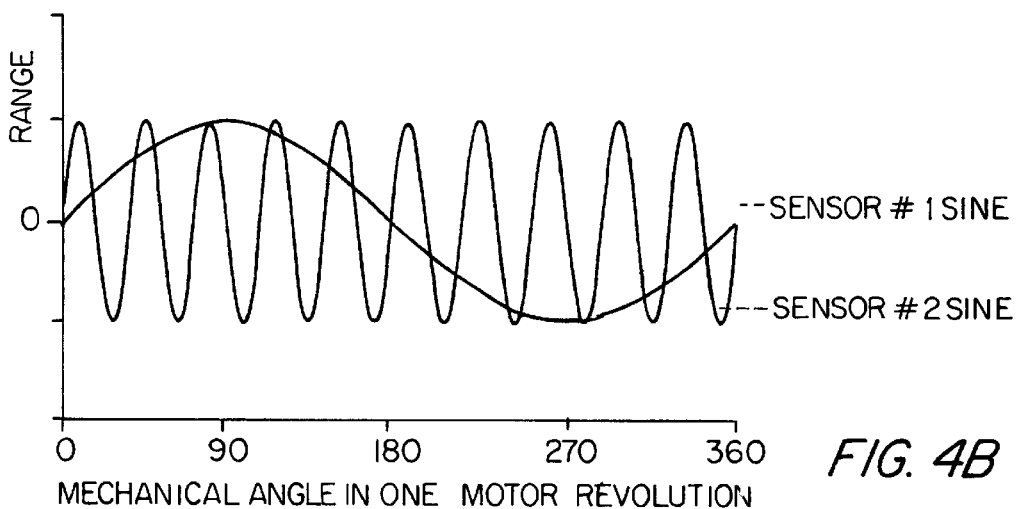

FIG. 4A depicts the sinusoidal signals that are derived from an inductive sensor, together with a corresponding quadrature state diagram. The two sinusoidal waveforms are used, as such, only by a master, or primary, MCU to resolve each cycle into thousands of discrete positions, so as to provide high-resolution data during real-time operation. Due to the extensive calculation time required and the electrical power needed to support such a high-speed, large-capacity (typically 32 bit) MCU and the associated circuitry, this operation is not suitable for use in a battery backup mode. Accordingly, a secondary MCU of smaller capacity (typically 8 bit) and much lower power demand is used in the backup mode for the simpler operations required; i.e., for absolute position tracking and battery power management functions, conserving power by dynamically establishing an optimal active duty cycle based upon movement of the motor shaft.

The second set of signals shown in FIG. 4A simplifies operation and calculation by converting the two sinusoidal waves into quadrature signals, which contain position-change information at each 90° interval as well as indicating the direction of the change. Position change within two adjacent crossover (or transition, or zero crossing) points is not required by the secondary MCU. By knowing the total count of quadrature states reported by the secondary MCU, as well as the actual value of a sine/cosine signal pair, the master MCU can calculate the actual absolute position at a high resolution level on start-up (restart), and can cause the motor to resume operating from the exact position it was in at the time of main power failure or disconnection.

Thus, when the main power to the motor is reestablished, position data are retrieved by causing the quadrature count data to be transferred from the secondary (low-power) MCU to the primary (high-power) MCU. Multi-turn absolute position is then reconstructed by converting quadrature data to a high resolution position value, and the actual position is established by adding or subtracting (as necessary) the correct information contained in the current sine/cosine cycle, in accordance with the expression:

[quadrature count/4]×[$N$ steps/feedback cycle]±current angle.

Operating the sensor with more than one cycle per revolution is similar to operation in a single cycle mode, with the exception that the sampling frequency should be increased, with a corresponding decrease of the maximum OFF time value, provided the same acceleration and speed-tracking capabilities are to be maintained. It follows that power consumption will be increased in direct proportion to the increase in the number of feedback cycles. For example, the use of a sensor that is configured to generate 50 cycles per revolution will reduce the life of the battery pack, in the exemplary system described, to several days (50 times less).

EXAMPLE THREE

While requiring much more power than a sensor that generates a single feedback cycle per revolution, a multiple-cycle sensor will of course afford much greater resolution and accuracy. Thus, if an MCU, having a ten-bit A/D converter can resolve each sine/cosine signal pair to 1,000 discrete position steps per cycle, then the resolution of the motor would be equal to 1,000 times the number of electrical cycles generated per revolution.

A dual-sensor position transducer, as herein described, provides high resolution coupled the advantages of single cycle operation; indeed, such a transducer provides advantages that do not necessarily depend upon power conservation. In a dual-sensor transducer, or motor, embodying the invention, both sensors will preferably be physically and electrically integrated so as to simultaneously generate sets of position data that can be discriminated from one another (by virtue of inherent electrical and physical design, and/or by electronic data processing means). For example, a first sensor circuit may produce a single feedback cycle per revolution (one sine/cosine pair), from which absolute position can be determined for one motor revolution, for access in the battery backup mode. A second sensor may then provide multiple feedback cycles (e.g., 50 sine/cosine pairs) per revolution, thus affording many times (e.g., 50) the resolution and accuracy level of the first sensor; i.e., absolute position and high resolution per motor revolution (360°/50= 7.2° mechanical) is available.

Figure 5:
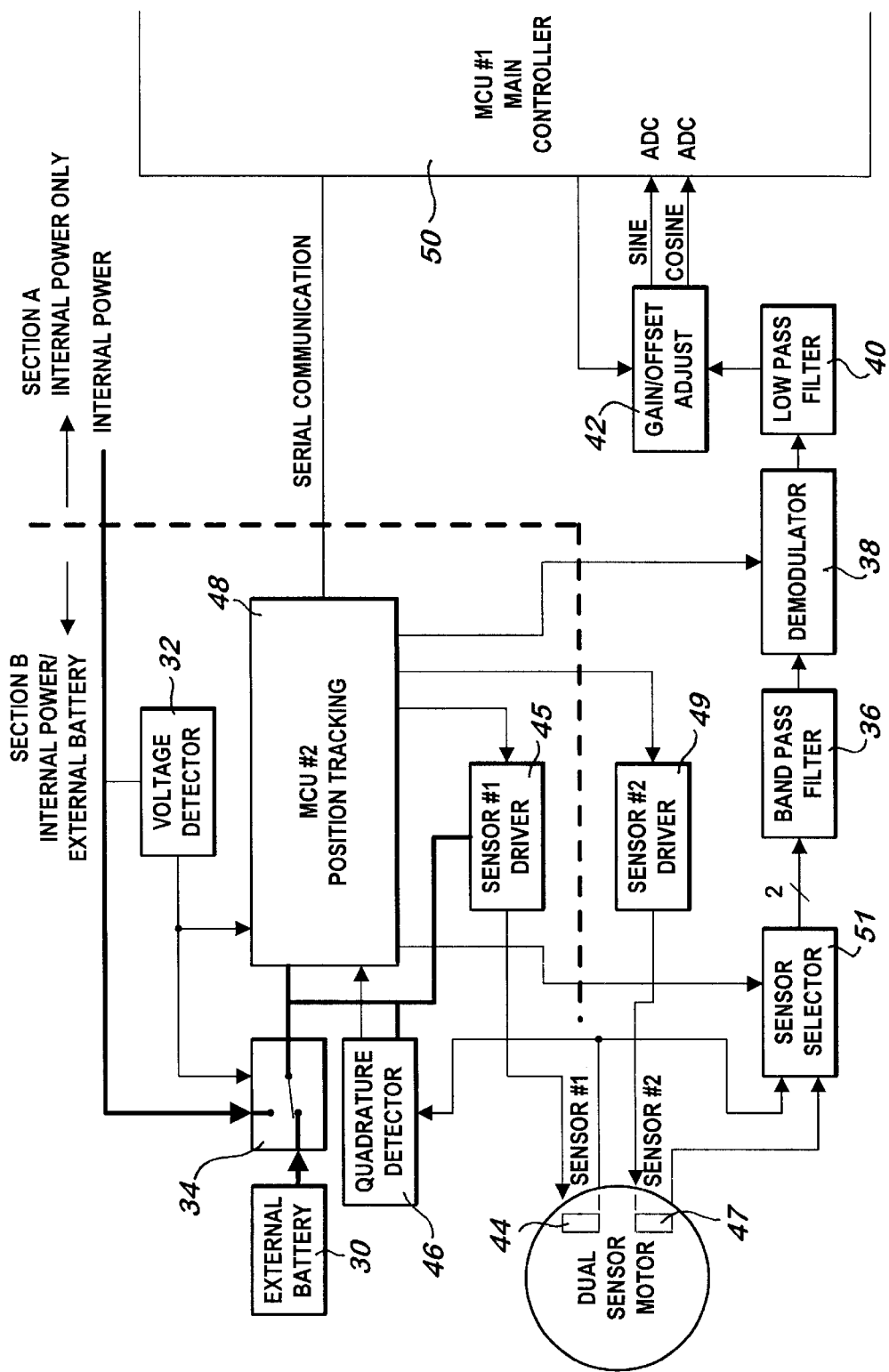
FIG. 5 is a block diagram illustrating an electronic circuit for a position control system embodying the invention, including a dual-sensor arrangement (the same Figure can be taken to illustrate a single sensor arrangement hereunder by omitting the second sensor, the sensor selector circuit, and the band pass filter).

A functional block diagram for a dual inductive sensor system embodying the invention (as well as for a single sensor system hereunder) is provided by FIG. 5. Operating in the normal mode, with the main power on, the complete circuit (consisting of Sections A and B in the figure, which are differentiated by the dash line) is powered by the motor drive power supply ("Internal Power"). The application of battery power ("External Battery") from circuit 30 is controlled by the switch circuit 34, in response to a signal from voltage detector 32. Circuits 36 through 42 are conventional processing components, and are used to demodulate the selected sensor signals and to produce sine/cosine signal pairs that can be resolved into high-resolution values. A first sensor 44, driven by the driver 45, is hardwired to the quadrature detector circuit 46, so that the quadrature signal is always available to the secondary MCU 48 for multi-revolution tracking, independent of operation of the primary MCU 50. A second sensor 47, driven by the driver 49, is included in accordance with the most desirable embodiments of the invention. In those instances in which the second sensor is not employed, however, the driver 49 and the selector 51 would of course be superfluous.

The external battery circuit 30 is connected to the Section B circuitry, by way of the switch circuit 34, to enter the backup mode when the voltage detector 32 senses that the internal power supply has fallen below a selected set point. In that mode high power-consumption circuits, such as provide sensor excitation drive signals, are controlled by the secondary MCU 48, and a variable operating duty cycle is applied by varying the OFF time setting, as a function of sampled motor velocity.

More particularly, and as will be discussed more fully below, velocity detection may be implemented by keeping track of the change in position data and the sampling time (ON time plus OFF time) used in preceding sample intervals, which data are updated appropriately. Summations of the position data and the OFF time intervals are used to calculate instantaneous velocity, and thereby to set a new OFF time value. In simplest form, the OFF time is equal to the maximum off time divided by the velocity, such that a zero velocity will maximize the OFF time value.

Although the position of the motor armature should not change when the machine in which it is installed is without power, external forces will often drive the armature (forward or backward, intentionally or inadvertently), which is of course the circumstance to which the present invention is principally addressed. In general, to achieve low-power operation in the battery backup mode, only a portion of the controller is powered by the battery source, and high power-drain devices are disconnected. During active access periods, the secondary MCP (or CPU, as the case may be) samples quadrature signals and compares them to the previous sample data to determine whether or not a position change has occurred. The direction of the motor can also be determined by identifying which of the two signals leads the other. To avoid errors, it is important that every state transition of the quadrature signal be counted, and it follows that the sampling rate must be increased as the motor shaft velocity (under an external drive force) increases so as to ensure that every quadrature signal transition is detected.

Velocity detection requires position (P) and time (T) data, in accordance with the basic motion formula V (velocity)= P/T; scaling factors are used to support integer operation. In accordance with one suitable method, position and time period (active+inactive) data are stored in a pair of memory arrays in each active sample interval. The arrays consist of n (for example, eight) elements, and operation occurs on a first-in, first-out (FIFO) basis; i.e. the newer data are always replaced by the older data. A "snap shot" of history, in position and time data, enables velocity to be estimated with sufficient accuracy to determine the proper duration of the next inactive time, which is set to be inversely proportional to the velocity with condition and limits applied; i.e.:

$$\text{Next Inactive Time}=0<(\text{MAX TIME}-(V*K))<=\text{MAX TIME},$$

where V is the velocity (in internal units), K is a conversion factor, and MAX TIME is a constant selected to limit the inactive time and to ensure that, if the motor accelerates from stop to x speed with the rate of n radians/second$^2$, the maximum will not cause operation error. For example, using eight element arrays:

| P data (step change) | T data (millisecond) | Comments |
|---|---|---|
| Newest Element: | | |
| n                0 | 12 | |
| n-1              1 | 12 | |
| n-2              0 | 16 | |
| n-3              1 | 16 | motor begins to move? |
| n-4              0 | 19 | no movement until here |
| n-5              0 | 18 | |
| n-6              0 | 17 | |
| Oldest Element | | |
| n-7              0 | 16 | |
| Sum =            2 | 126 | |

These data indicate that two quadrature steps changed in the last 126 millisecond, and enable the next inactive time to be determined. The length of the memory arrays is arbitrary, but must of course be sufficient to provide adequate velocity information. The higher the number of elements in the array the greater the accuracy, but more system active time will of course be required to manipulate all of the data acquired. It should be appreciated that the control method described is applicable to encoder, single sensor and dual-sensor systems, in accordance herewith.

As indicated above, an inductive position transducer that utilizes two different sensors, one that has an output of many (e.g., 50) electrical cycles per mechanical revolution, and one that has an output of a few (e.g., a single) electrical cycles per revolution, will often be of substantial benefit. The combined information from the two sensors allows the position information obtained to be absolute and at a very high level of resolution and accuracy, and this is so irrespective of power conservation considerations.

In accordance with the present invention, it has been found to be of particular advantage to provide two such sensors integrated with one another and disposed substantially in a single plane. Doing so reduces the axial length of the device comprising or incorporating the transducer and, by constituting a single unit, facilitates manufacturing and handling operations. Such a dual-sensor transducer may be integrated into a motor (as for example in a direct drive motor, in which axial length is of particular importance); it may be mounted on the back of a traditional servo motor; or it may take the form of a stand-alone sensor contained in a suitable housing and provided with bearings and the like.

Turning now in detail to FIGS. 6 and 7 of the drawings, therein illustrated is a dual-sensor position transducer embodying the present invention and consisting of integrated 50-cycle and single cycle sensors, disposed in a coplanar relationship to one another. The transducer consists of a stator and a rotor, generally designated by the numerals 52 and 54, respectively. The stator 52 has eight pole elements 56, each of which has three axially extending teeth 58 formed into its radially inner end portion. The pole elements 56 are numbered 1 through 8 for convenience of reference, and their angular relationships to one another are indicated. Each pole element is wound with two coils, 60 and 62, the terminals of which are designated by the letters A and B, and C and D, respectively; the coils 60,62 are identical and are electrically separated from one another.

The rotor 54 is formed with a circular array of 50 axially extending teeth 64, spaced 7.2° from one another. As can be seen in FIG. 7, the rotor is of wedge-shaped cross section, taken along line 7—7 of FIG. 6.

Figure 8:
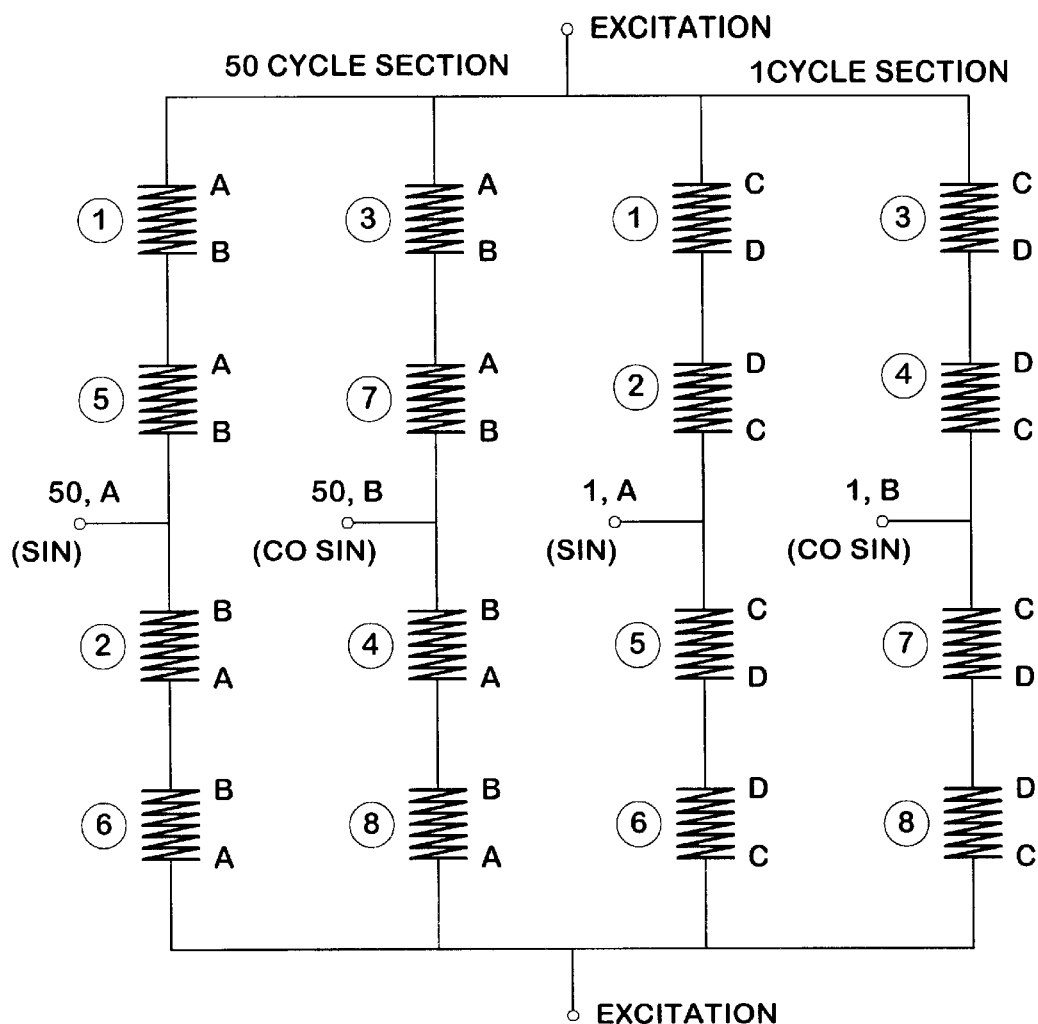
FIG. 8 is a diagram showing the arrangement of electrical connections for the coils utilized in the assembly of FIGS. 6 and 7.

FIG. 8 depicts the coil connections, whereby pairs of coils produce a total of eight different inductances (reactances), configured to provide two channels, or sections; a 50-cycle channel provides sine and cosine signals at 50,A and 50,B, respectively, and a single cycle channel provides sine and cosine signals at 1,A and 1,B, respectively. The bridges are energized by an AC voltage, and the outputs (50,A, 50,B, 1,A, and 1,B) constitute the differences in reactance between the upper bridge and the lower bridge, total (two coil) reactances.

Figure 9:
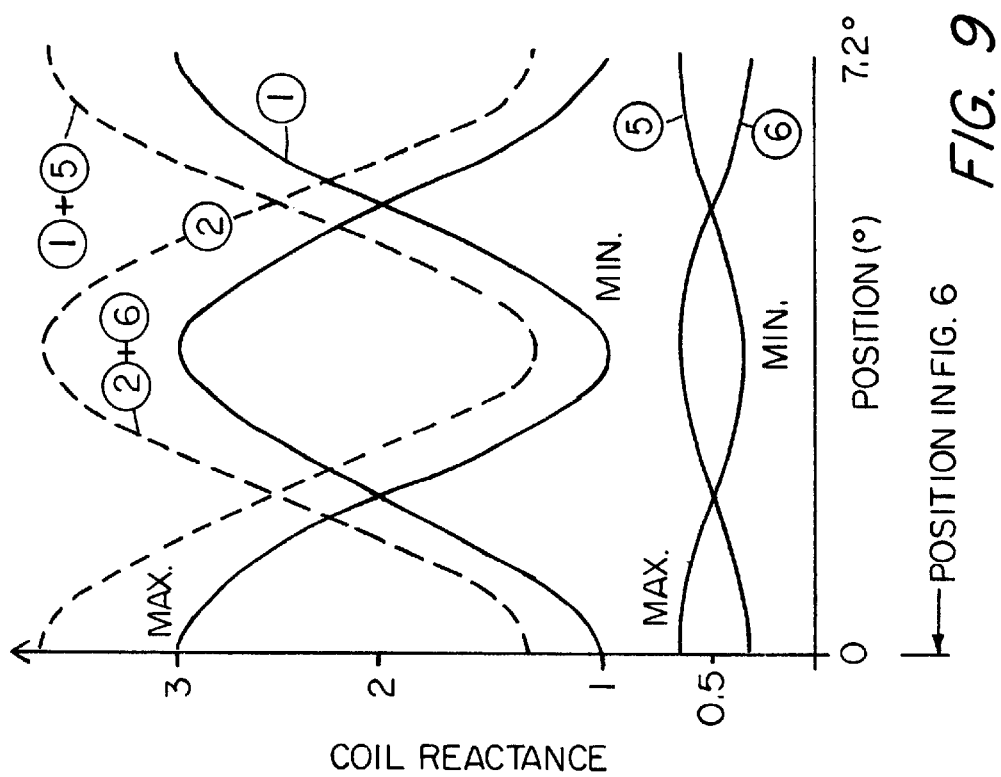

FIG. 9 shows the variations of reactance in the individual coils, as a function of position over a span of 7.2°, or one of the 50 cycles. (As in all subsequent figures, one 50-cycle channel [50,A] and one 1-cycle channel [1,A] is shown; also, rotor position "0" corresponds to the position shown in FIGS. 6 and 7.) The curves designated 1 and 2 are 180 electrical degrees phase shifted. Since the total length of the wedge-shaped rotor 54 lies in the magnetic field of pole elements 1 and 2, the reactances are high. Pole elements 5 and 6 are also 180° phase shifted but, because essentially no rotor length lies in the paths of their magnetic fields, the reactances are low. Needless to say, rotating the rotor 54 by 180 mechanical degrees will reverse the reactive relationships in the coils.

Figure 10:
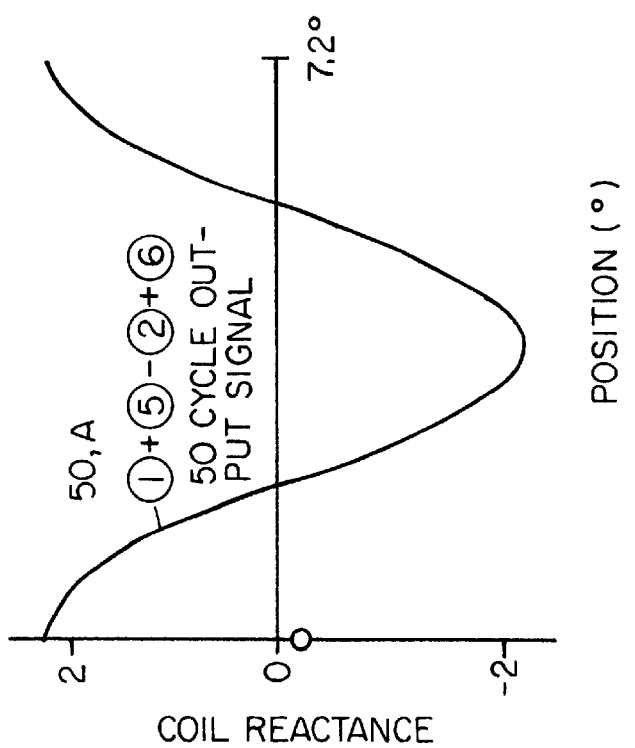
FIGS. 9 through 16 are curves showing reactance variations and interactions in the several coils.
Figure 12:
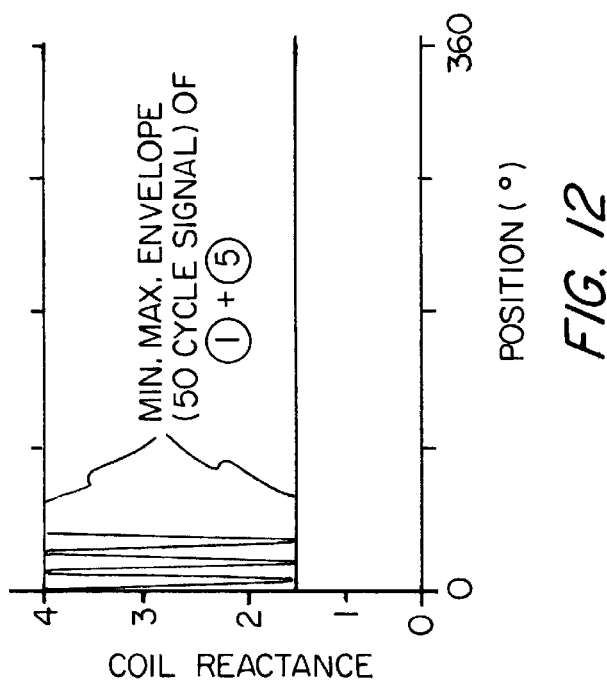
Figure 11:
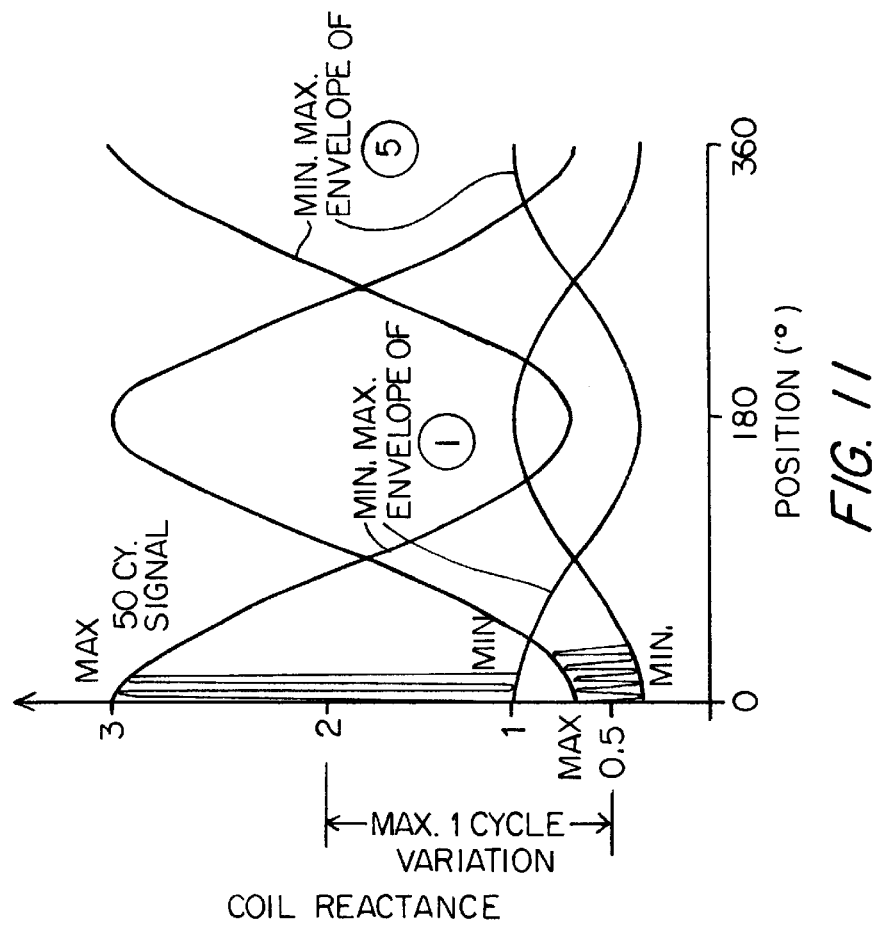

FIG. 10 shows the corresponding 50-cycle output signal at point 50,A; a similar signal (not shown), phase shifted 90° from the first, is obtained at point 50,B. FIG. 11 shows the effect of the 1-cycle disturbance on the 50-cycle envelope (peaks of the 50-cycle signal), for coil 1 and coil 5, which are in phase with respect to the 50-cycles signals. The 1-cycle disturbance on the 50-cycle envelope for the upper bridge (1+5) cancels, as is shown in FIG. 12; accordingly, the 1-cycle disturbance on points 50,A and 50,B is nil.

Figure 14:
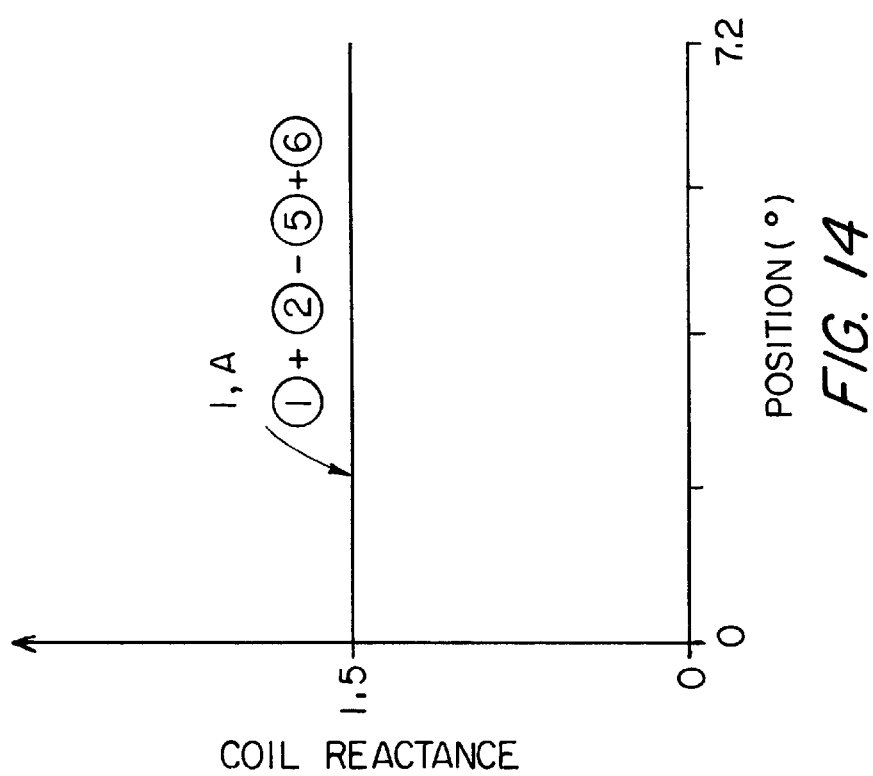
Figure 13:
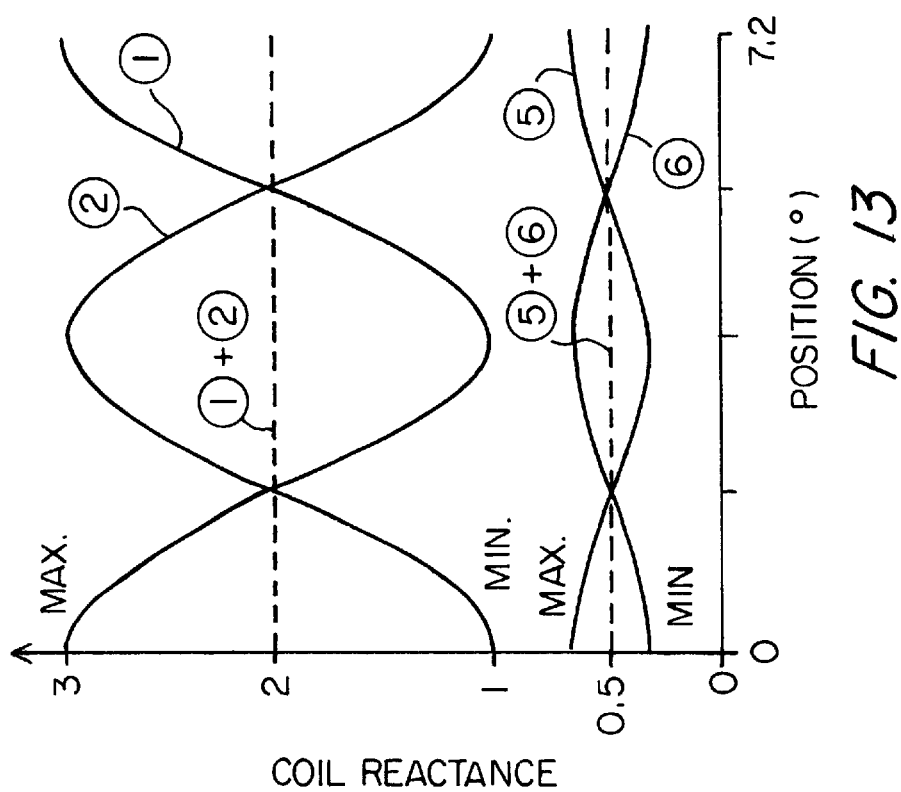
Figure 16:
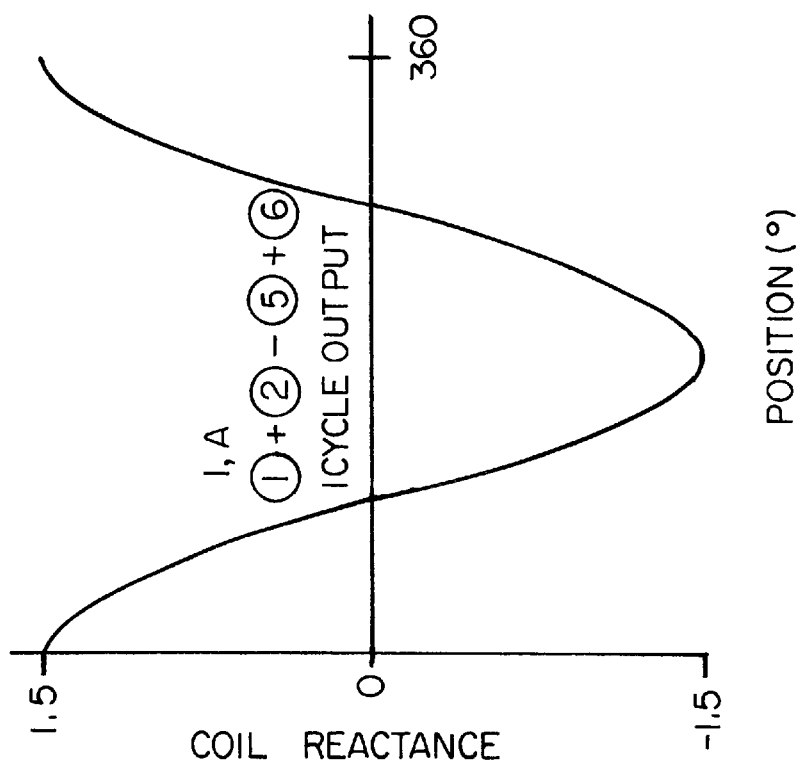
Figure 15:
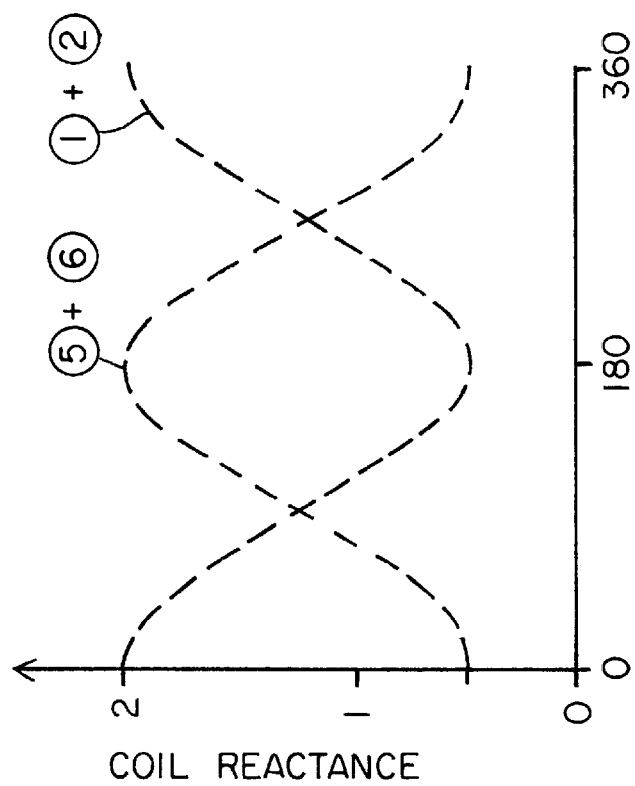

FIG. 13 shows the coil reactances, forming one channel of the 1-cycle per revolution sensor, again over a span of 7.2°. Coils 1 and 2, and also coils 5 and 6, have a 180° phase shift relationship to the 50-cycle disturbance, thereby cancelling the 50-cycle disturbance, as shown in FIG. 14. FIG. 15 shows the reactances of the upper and lower parts of the 1-cycle per revolution bridge, and FIG. 16 indicates the corresponding output at point 1,A; the output at point 1,B is identical, but 90 degrees phase shifted.

Figure 17:
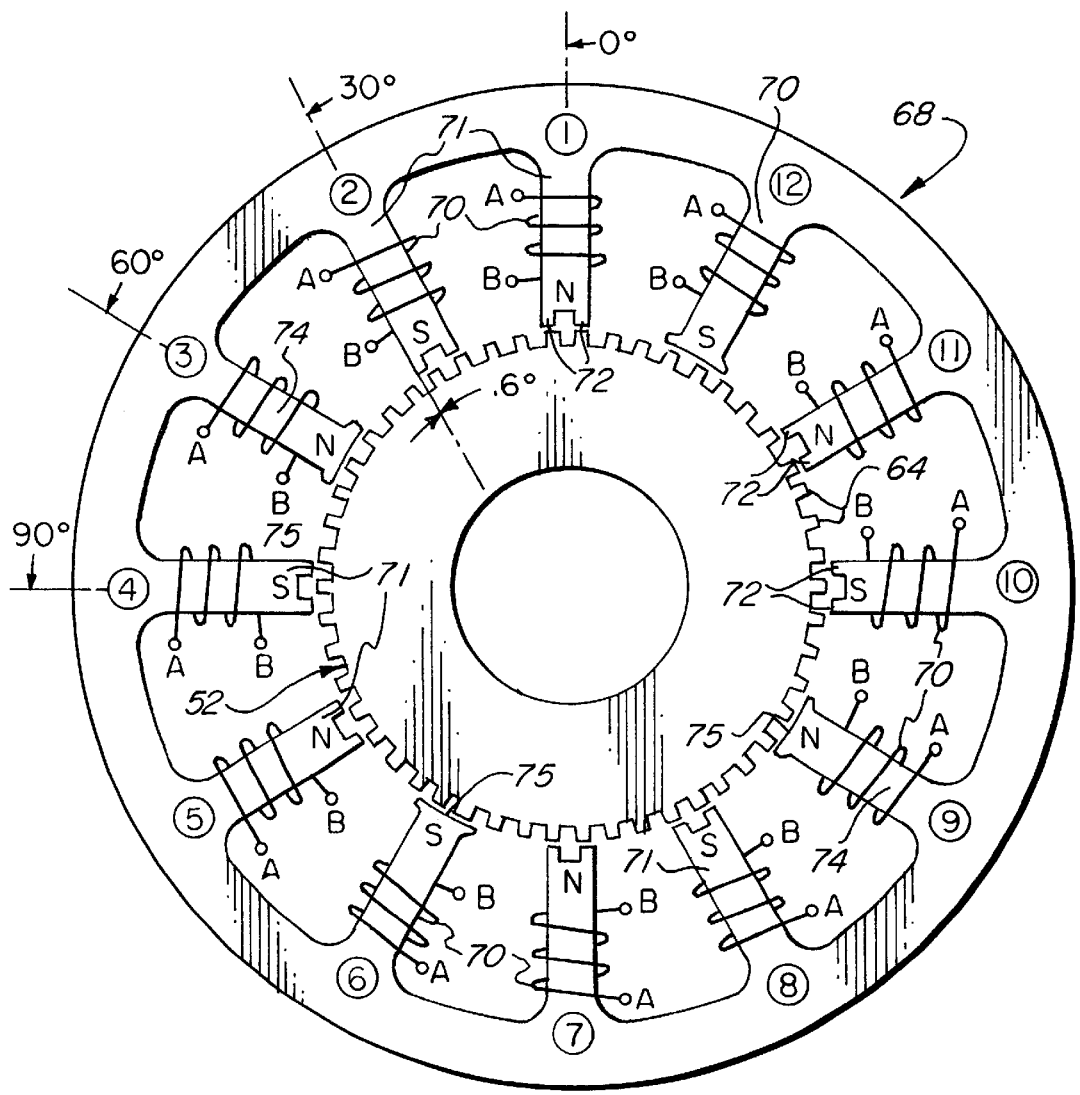
FIG. 17 is a planar view showing a second form of rotor/stator assembly embodying the invention.

FIG. 17 illustrates a second form of dual-sensor position transducer embodying the invention, similar to that of FIGS. 6 and 7 but utilizing a stator 68 having 12 monofilar wound pole elements 70, rather than eight bifilar wound elements. As will be noted, adjacent pairs of pole elements 71 (e.g., 1 and 2) are formed with axially extending teeth 72, whereas the intervening elements 74 (e.g., 3) are formed with substantially flat faces 75; again the rotor 52 is of wedge-shaped cross section and is formed with 50 axially extending circumferential teeth 64.

Figure 18:
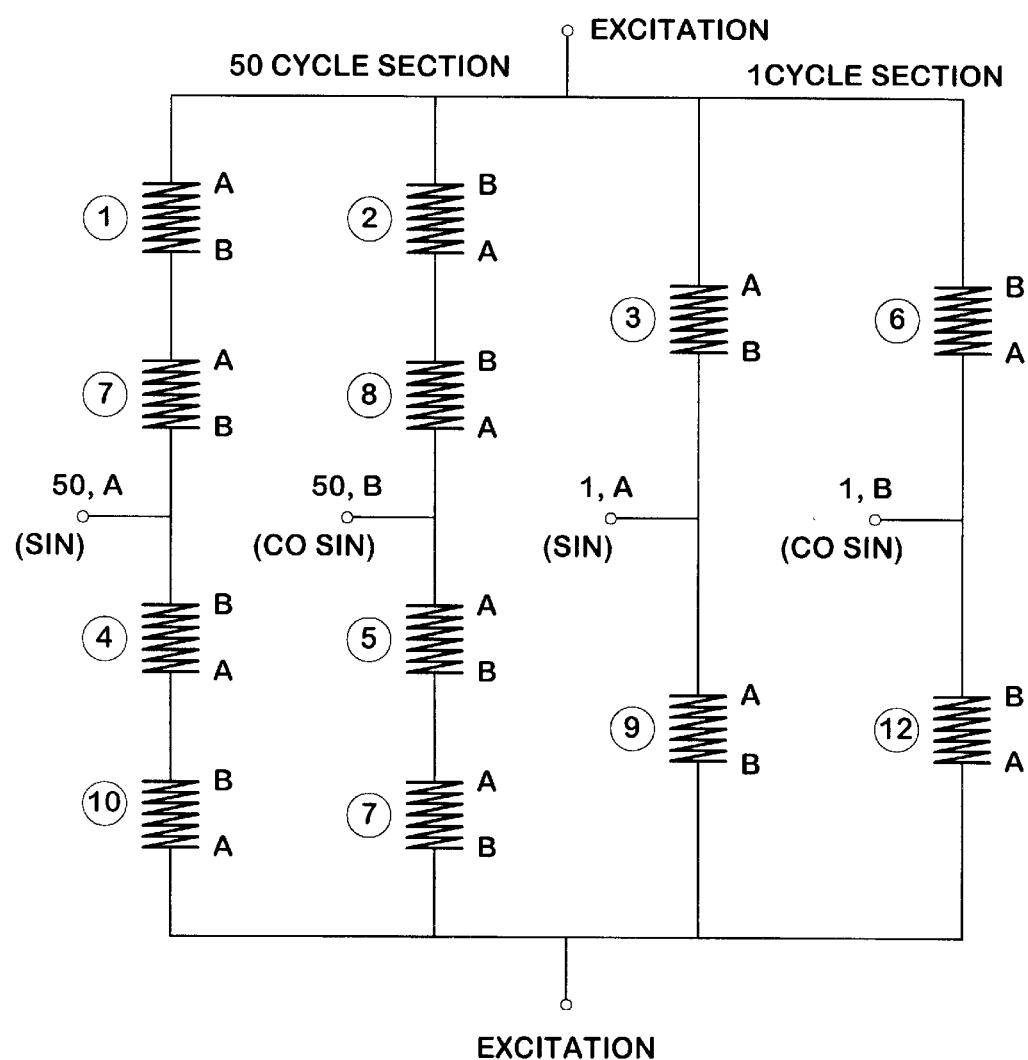
FIG. 18 is a coil-connection diagram for the assembly of FIG. 17.

The coil connections for the transducer of FIG. 17 are depicted in FIG. 18. The width of the tips of the four poles from which teeth are omitted is 2.5 times the rotor tooth pitch, such that the coil reactance remains constant over a span of 7.2°; hence, the 50-cycle disturbance on the 1-cycle signal is nil (over that angular distance the stator pole tip always covers the equivalent of two teeth). The 50-cycle and 1-cycle sections operate in the same manner as in the transducer of FIGS. 6 and 7, albeit different pole elements will of course be involved.

Figure 19:
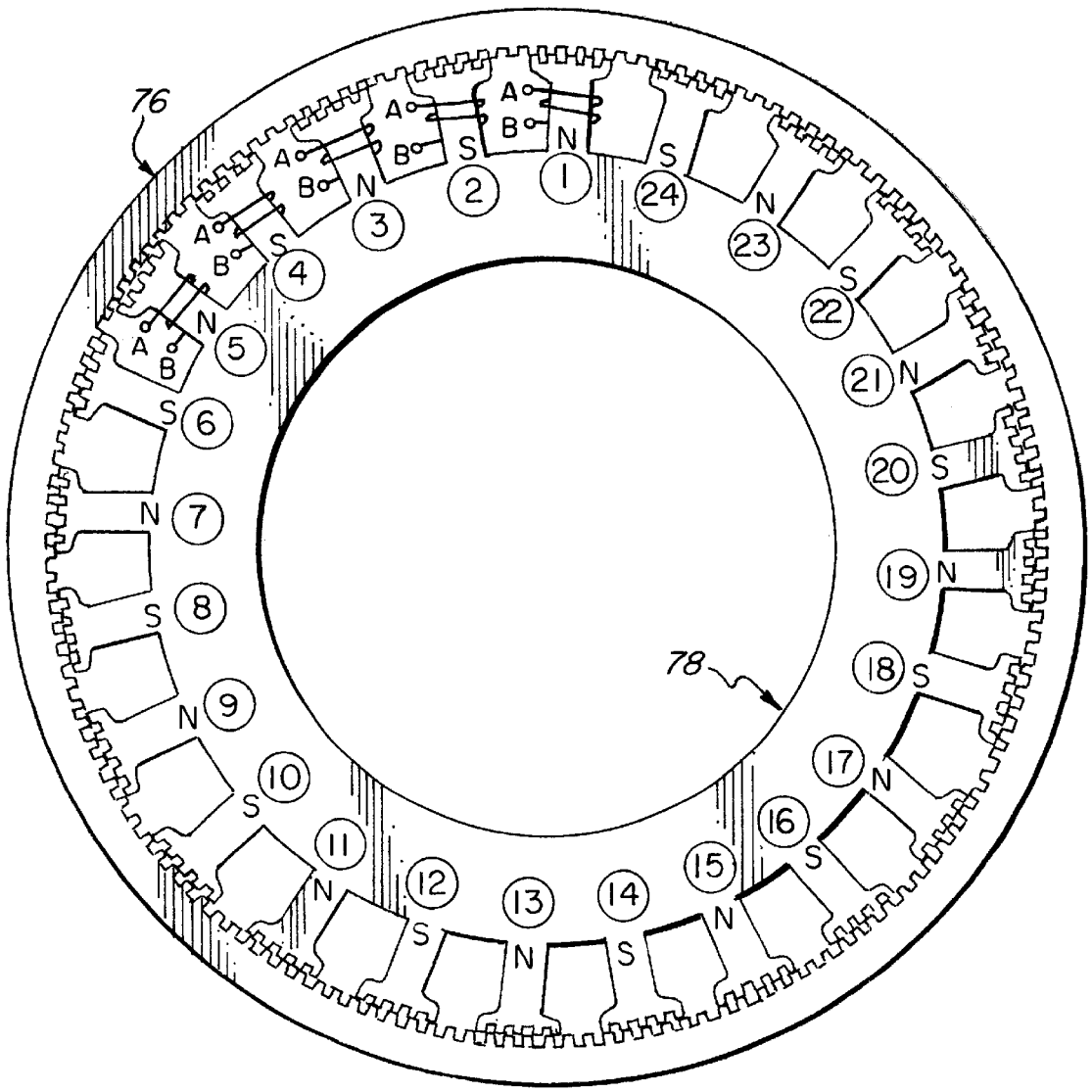
FIG. 19 is a planar view of a further form of rotor/stator assembly embodying the invention.
Figure 20:
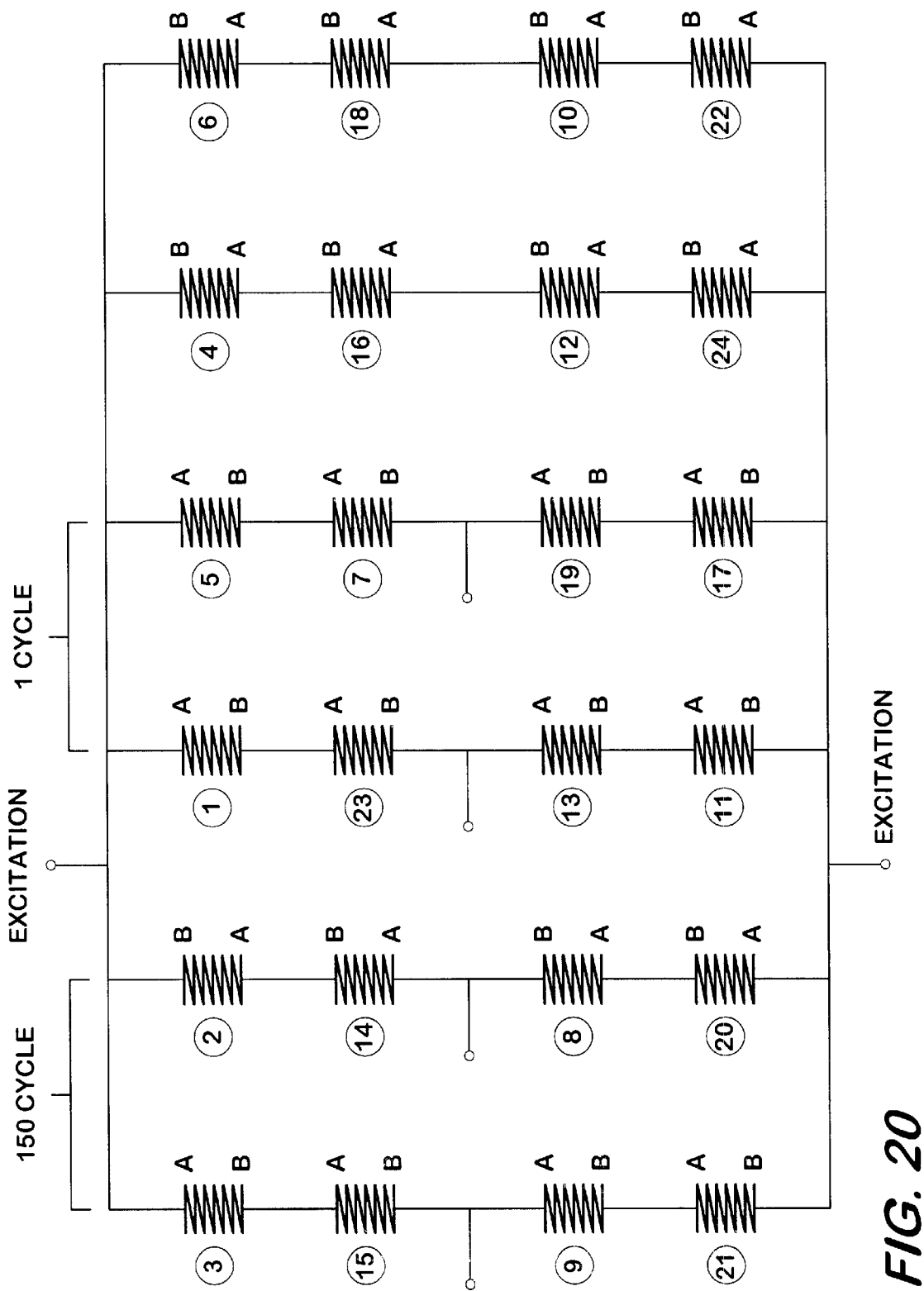
FIG. 20 is a coil-connection diagram for the assembly of FIG. 19.

Turning finally to FIGS. 19 and 20, therein illustrated are a 24 stator pole version of a position transducer (particularly suitable for use in a direct drive motor), and the coil connections, respectively. In this instance the rotor 76 and stator 78 are inverted (i.e., the rotor is on the outside), and all stator poles are wound with a single coil; also, the high-resolution sensor section provides 150 electrical cycles per revolution. The rotor 76 may be wedge-shaped or eccentric, relative to the stator, and the cancellation mechanisms for both the 1-cycle and also the 150-cycle sensor sections are the same as have previously been described. Although eight of the coils are not used to produce signals, they must nevertheless be energized. Other coil connections utilizing them may be employed, either to increase signal magnitude or to electrically shift the signals relative to one another.

Thus, it can be seen that the present invention provides a novel control system and method for the continuous, non-volatile tracking of the position of a motor armature. A secondary, battery-powered backup circuit may be provided to maintain position-tracking capability despite loss or termination of power in the primary power supply, and power may be conserved so as to extend substantially the useful life of the battery. The invention also provides a novel dual-sensor position transducer which is suitable for use in such a tracking system and method, which transducer is of compact, and relatively non-complex and inexpensive, construction.

Having thus described the invention, what is claimed is:

1. A control system for the continuous, non-volatile tracking of the position of a motor armature, comprising:

motor armature position data acquisition and storage means, including an armature position transducer, at least one electronic data processing unit, and sampling means for causing said electronic data processing unit to intermittently access said position transducer, for defined time periods and at controlled variable frequency of access;

a primary power supply circuit for delivering drive current to the motor;

a battery-powered secondary circuit; and means for operatively connecting said primary power supply circuit to said data acquisition and storage means, and for connecting, automatically and only upon disruption of power in said primary power supply circuit, said secondary circuit to said data acquisition and storage means to provide a backup operating mode; said frequency of access caused by said sampling means in said back-up mode varying in a direct relationship to the speed of the motor armature, as detected by said position transducer.

2. The system of claim 1 wherein active periods, during which said position transducer draws full operating power, are limited substantially to said defined periods of access.

3. The system of claim 2 wherein all of said active periods are of the same duration, and wherein said frequency of access is varied by varying the duration of inactive periods, intervening between said active periods and all of equal duration, during which said position transducer draws substantially less than full operating power, whereby power is applied to said position transducer in accordance with a variable duty cycle.

4. The system of claim 3 wherein said primary power supply circuit is disconnected from said data acquisition and storage means when said secondary circuit is connected thereto, and wherein said position transducer draws substantially no power during said inactive periods.

5. The system of claim 1 wherein said position transducer comprises at least one sensor selected from the group consisting of encoders and inductive sensors, said sensors being constructed for the detection of rotary armature movement.

6. The system of claim 5 wherein said one sensor generates at least one set of at least two electrically out-of-phase signals that vary sinusoidally so as to represent trigonometric functions from which the angle of a shaft of a motor can be determined.

7. The system of claim 6 wherein said sampling means is configured for utilizing only said one signal set for varying said frequency of access in said backup mode.

8. The system of claim 7 wherein said sampling means comprises a zero crossing point detector.

9. The system of claim 7 wherein said one signal set consists of two signals that bear a 90° phase relationship to one another, and wherein said trigonometric functions are sine and cosine functions and said sampling means comprises a quadrature detector.

10. The system of claim 7 wherein said position transducer comprises a second sensor, wherein said one signal set is a first signal set representing a minimal whole number of electrical cycles of said at least two signals, wherein said second sensor is configured to generate a second signal set representing a multiple whole number of said minimal number of said electrical cycles, and wherein only said first signal set is utilized for causing said frequency of access to vary.

11. The system of claim 10 wherein said first and second sensors comprise a substantially circular rotor body into which components of each of said sensors are integrated.

12. The system of claim 11 wherein said rotor body is of generally wedge-shaped cross section, so as to induce a single electrical cycle per revolution and to provide said first signal, and wherein the periphery of said rotor body is so constructed as to induce multiple electrical cycles per revolution and to provide said second signal.

13. The system of claim 1 wherein said data acquisition and storage means includes a primary electronic data processing unit, of relatively high computing capability and power requirements, and a secondary electronic data processing unit of relatively low computing and power requirements, said data processing units being operatively connected to enable data transfer at least from said secondary unit to said primary unit, and only said secondary unit being operative for accessing said position transducer in said backup mode.

14. A method for the continuous, non-volatile tracking of the position of a motor armature utilizing a control system comprised of motor armature position data acquisition and storage means, including an armature position transducer, at least one electronic data processing unit, and sampling means for causing said electronic data processing unit to intermittently access the position transducer, for defined time periods and with a controlled variable frequency of access; and a battery-powered secondary circuit, comprising the steps:

operatively connecting to said data acquisition and storage means a primary power supply circuit used for delivering drive current to the motor;

automatically, and only upon disruption of power in said primary power supply circuit, operatively connecting said secondary circuit to said data acquisition and a storage means, to provide a back-up operating mode; and causing the frequency of access of said data acquisition and storage means by said sampling means in said back-up mode to vary in a direct relationship to the speed of the motor armature, as detected by said position transducer.

15. The method of claim 14 wherein active periods, during which said position transducer draws full operating power, are limited substantially to said defined periods of access.

16. The method of claim 15 wherein all of said active periods are of the same duration, and wherein said frequency of access is varied by varying the duration of inactive periods, intervening between said active periods and all of equal duration, during which said position transducer draws substantially less than full operating power, whereby power is applied to said position transducer in accordance with a variable duty cycle.

17. The method of claim 16 wherein said primary supply circuit is disconnected from said data acquisition and storage means when said secondary circuit is connected thereto, and wherein said position transducer draws substantially no power during said inactive periods.

18. The method of claim 14 wherein said method tracks the actual position of said motor armature relative to a home position.

19. The method of claim 14 wherein said position transducer comprises at least one sensor that generates at least one set of at least two electrically out-of-phase signals that vary sinusoidally so as to represent trigonometric functions from which a motor armature angle can be determined, and wherein said frequency of access in said backup mode is based upon the total number of zero crossing points engendered by said at least one set of at least two out-of-phase signals.

20. The method of claim 19 wherein said frequency of access is equal to said total number of crossing points.

21. The method of claim 20 wherein said at least one set consists of two signals that bear a 90° phase relationship to one another, and wherein said trigonometric functions are sine and cosine.

22. The method of claim 19 wherein said position transducer comprises a second sensor, wherein said at least one sensor is configured to generate a first signal set representing a minimal whole number of electrical cycles of said at least one set of at least two signals and said second sensor is configured to generate a second signal set representing a multiple whole number of said minimal number of said electrical cycles, and wherein said first signal set only is utilized for causing said frequency of access to vary.

23. The method of claim 22 wherein said minimal number is unity.

24. The method of claim 23 wherein said multiple number is at least one order of magnitude larger than said minimal number.

25. The method of claim 14 wherein said data acquisition and storage means includes a primary electronic data processing unit, of relatively high computing capability and power requirements, and a secondary electronic data processing unit of relatively low computing capability and power requirements, said data processing units being operatively connected to enable data transfer at least from said secondary unit to said primary unit, and wherein only said secondary unit is operative for accessing said position transducer in said backup mode.

26. A control system for tracking the position of a motor armature, comprising motor armature position data acquisition and storage means, including an armature position transducer, at least one electronic data processing unit, and sampling means for causing said electronic data processing unit to intermittently access said position transducer, for defined time periods and at controlled frequency of access, said position transducer comprising first and second inductive sensors, one of said inductive sensors being configured to generate a first signal set and the other of said sensors being configured to generate a second signal set, each of said signal sets consisting of two sinusoidal signals that are 90° out of phase with one another and that represent sine and cosine functions from which the angle of the shaft of a motor can be determined, said fist signal set representing a minimal whole number of electrical cycles of said two signals and said second signal set representing a multiple whole number of said minimal number of said electrical cycles, said first and second sensors being selectively accessible by said electronic data processing means by way of said sampling means.

27. The system of claim 26 wherein said minimal number is unity and said multiple number is at least one order of magnitude larger than said minimal number.

28. The system of claim 27 wherein said first and second sensors comprise a substantially circular rotor body into which components of each of said sensors are integrated.

29. The system of claim 28 wherein said rotor body is of generally wedge-shaped cross section, to induce a single electrical cycle per revolution and to provide said first signal, and wherein the periphery of said rotor body is constructed to induce multiple electrical cycles per revolution and to provide said second signal.

* * * * *